United States Patent
Sugita et al.

(10) Patent No.: US 10,319,490 B2
(45) Date of Patent: Jun. 11, 2019

(54) CONDUCTIVE ELASTOMER COMPOSITION AND MOLDED ARTICLE OF THE SAME

(71) Applicant: Hitachi Metals, Ltd., Tokyo (JP)

(72) Inventors: Keisuke Sugita, Tokyo (JP); Akinari Nakayama, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 184 days.

(21) Appl. No.: 15/282,182

(22) Filed: Sep. 30, 2016

(65) Prior Publication Data

US 2017/0098488 A1    Apr. 6, 2017

(30) Foreign Application Priority Data

Oct. 2, 2015 (JP) ................. 2015-196853

(51) Int. Cl.
| | | |
|---|---|---|
| *H01B 1/20* | (2006.01) | |
| *C08L 25/08* | (2006.01) | |
| *H01B 1/24* | (2006.01) | |
| *C08L 23/14* | (2006.01) | |
| *C08L 53/02* | (2006.01) | |
| *C08K 3/04* | (2006.01) | |
| *C08L 91/00* | (2006.01) | |

(52) U.S. Cl.
CPC ................. *H01B 1/24* (2013.01); *C08K 3/04* (2013.01); *C08L 23/14* (2013.01); *C08L 53/025* (2013.01); *C08L 91/00* (2013.01); *C08L 2203/20* (2013.01)

(58) Field of Classification Search
CPC .......... C08L 23/00; C08L 53/02; C08L 23/12; C08L 23/10; C08L 53/00; C08L 25/04; C08L 25/08; C08L 2207/04; H01B 1/20; H01B 1/24
See application file for complete search history.

(56) References Cited

U.S. PATENT DOCUMENTS

| | | | |
|---|---|---|---|
| 4,739,005 A | | 4/1988 | Araki et al. |
| 6,384,128 B1 * | | 5/2002 | Wadahara ................ C08K 3/04 524/496 |
| 6,476,139 B2 * | | 11/2002 | Akaike .................... C08L 23/10 525/191 |
| 2006/0110599 A1 * | | 5/2006 | Honma ..................... B32B 5/10 428/413 |
| 2009/0283973 A1 * | | 11/2009 | Koh ........................ C08F 297/04 277/500 |
| 2010/0266941 A1 | | 10/2010 | Minagoshi |
| 2013/0281596 A1 * | | 10/2013 | Mohan .................... C08L 23/16 524/427 |
| 2013/0289158 A1 * | | 10/2013 | Youn ....................... C08L 23/02 523/122 |

FOREIGN PATENT DOCUMENTS

| | | | |
|---|---|---|---|
| JP | 63-256636 A | | 10/1988 |
| JP | 2002-338780 A | | 11/2002 |
| JP | 2002338780 A | * | 11/2002 |
| JP | 2010-256426 A | | 11/2010 |

OTHER PUBLICATIONS

Machine translation of JP-2002338780-A.*
Japanese Office Action, dated Apr. 17, 2019, in Japanese Application No. 2015-196853 and English Translation thereof.

* cited by examiner

*Primary Examiner* — Haidung D Nguyen
(74) *Attorney, Agent, or Firm* — McGinn I. P. Law Group, PLLC

(57) ABSTRACT

There is provided an elastomer composition having both of a flexibility and a wear resistance at a low temperature, while having a high conductivity, and containing an elastomer component (A) including styrene-based thermoplastic elastomer (a1) and propylene-based elastomer (a2); and containing 10 pts.mass or more and 100 pts.mass or less of a conductivity imparting agent (B), and 10 pts.mass or more and 300 pts.mass of less of a process oil (C) based on 100 pts.mass of the elastomer component (A).

19 Claims, 1 Drawing Sheet

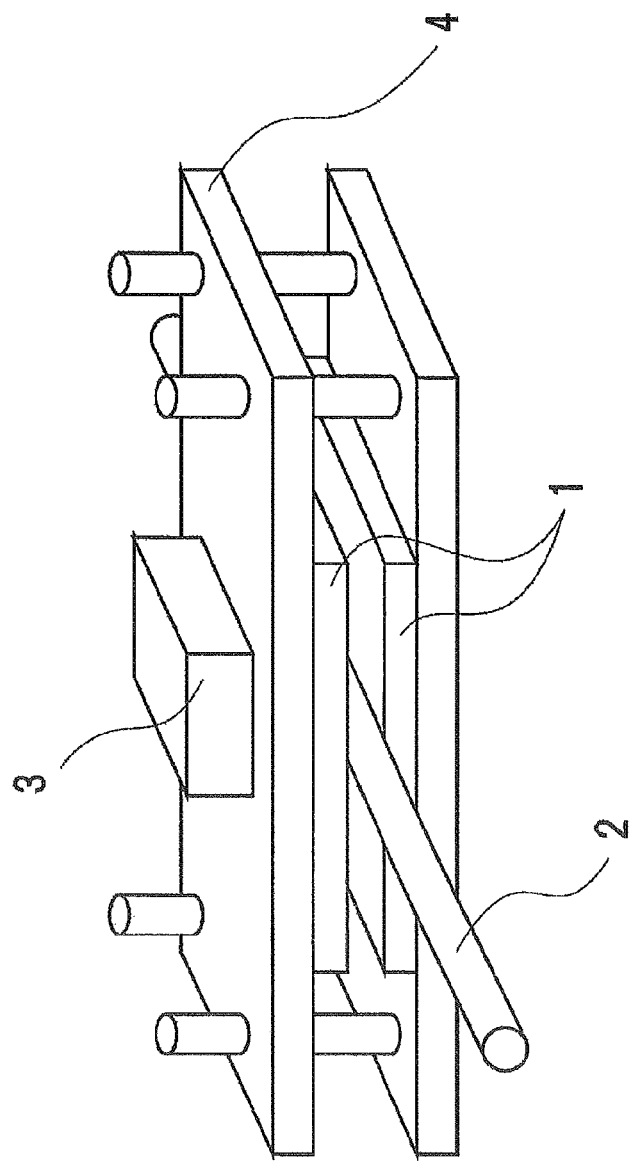

CONDUCTIVE ELASTOMER COMPOSITION AND MOLDED ARTICLE OF THE SAME

The present application is based on Japanese Patent Application No. 2015-196853 filed on Oct. 2, 2015, the entire contents of which are hereby incorporated by reference.

BACKGROUND

Technical Field

The present invention relates to a conductive elastomer composition and a molded article of the same.

Description of Related Art

Members such as an electromagnetic shielding, anti-static materials, and pressure-sensitive switch electrodes, are generally produced by using a conductive rubber composition by crosslinking, and for example, produced by mixing a conductivity imparting agent such as carbon black into a rubber material like ethylene-propylene-diene rubber, and molding and thereafter crosslinking the mixture. As a crosslinking method, there is a method of irradiating an electron beam, or a method of previously mixing a crosslinking agent into the conductive rubber composition, and crosslinking the mixture by hot-air or hot-pressing, and high pressure steam, after being molded.

However, when the conductive rubber composition is molded and crosslinked, the number of steps is increased by the molding and crosslinking when carried out in separate steps, resulting in a low production efficiency and a high production cost. Even if the molding and crosslinking are carried out in the same line, much time is required for the crosslinking, thus likely resulting in the low production efficiency and the high production cost.

Therefore, in recent years, in place of the rubber material which requires the crosslinking, use of a thermoplastic elastomer which does not require the crosslinking, has been taken into consideration. For example, in patent document 1, styrene-based thermoplastic elastomer is used as the thermoplastic elastomer. Specifically, an elastomer composition containing styrene-ethylene-butylene-styrene block copolymer, and containing a maleic acid-modified styrene anhydrous-ethylene-butylene-styrene block copolymer, is used. Further, a highly crystalline resin (such as polypropylene) is also mixed together with the carbon black, for imparting heat resistance and adjusting hardness.
Patent document 1: Japanese Patent Laid Open Publication No. 2002-338780

SUMMARY OF THE INVENTION

However, in the elastomer composition disclosed in patent document 1, when a mixture amount of the carbon black is increased to obtain a high conductivity, flexibility at a low temperature becomes insufficient in some cases. Therefore, when the elastomer composition is molded for example as an electrode of a pressure-sensitive switch, there is a possibility that a performance characteristic of the pressure-sensitive switch becomes low at a low temperature. There is also a possibility that a wear resistance is likely to be low as the flexibility becomes low at a low temperature, thus involving a problem of causing easy abrasion during production or use of the pressure-sensitive switch, etc., and causing a reduction of reliability of a product life and operation.

In view of the above-described problems, the present invention is provided, and an object of the present invention is to provide an elastomer composition having both of the flexibility and wear resistance at a low temperature while having high conductivity, and a molded article of the same.

According to an aspect of the present invention, there is provided an elastomer composition containing an elastomer component (A) including styrene-based thermoplastic elastomer (a1) and propylene-based elastomer (a2); and containing 10 pts.mass or more and 100 pts.mass or less of a conductivity imparting agent (B), and 10 pts.mass or more and 300 pts.mass of less of a process oil (C) based on 100 pts.mass of the elastomer component (A).

According to another aspect of the present invention, there is provided a molded article composed of an elastomer composition, the elastomer composition containing an elastomer component (A) including styrene-based thermoplastic elastomer (a1) and propylene-based elastomer (a2), and containing 10 pts.mass or more and 100 pts.mass or less of a conductivity imparting agent (B), and 10 pts.mass or more and 300 pts.mass of less of a process oil (C) based on 100 pts.mass of the elastomer component (A).

BRIEF DESCRIPTION OF THE DRAWINGS

FIG. 1 is a schematic view showing a method of evaluating a wear resistance of a sheet composed of a thermoplastic elastomer composition according to an example.

DETAILED DESCRIPTION OF THE INVENTION

After study by inventors of the present invention, it is found that reduction of flexibility at a low temperature and reduction of wear resistance at the time of increasing an amount of a conductivity imparting agent in an elastomer composition, is caused by a highly crystalline resin such as polypropylene.

As described above, the highly crystalline resin is mixed for the purpose of improving the heat resistance of thermoplastic elastomer, or adjusting hardness of the thermoplastic elastomer. The highly crystalline resin has a less amorphous region, and a large crystalline region, and therefore has an excellent heat resistance. Generally, fillers such as a conductivity imparting agent is incorporated in the amorphous region, and therefore the highly crystalline resin having the less amorphous region has low filler acceptability, and is likely to have a poor dispersibility of the conductivity imparting agent.

When a small amount of conductivity imparting agent is mixed in a mixture of such a highly crystalline resin and thermoplastic elastomer, the conductivity imparting agent is dispersed mainly in the thermoplastic elastomer. However, in a case of a small amount, the conductivity imparting agent can be well dispersed without cohesion.

On the other hand, when a large amount of conductivity imparting agent is mixed, the conductivity imparting agent is dispersed not only in the thermoplastic elastomer, but also in the highly crystalline resin having low filler acceptability. As a result, the elastomer composition is easily scraped, and the wear resistance becomes low. Further, during crystallization of the highly crystallized resin, the conductivity imparting agent contained therein is eliminated to outside and driven toward the thermoplastic elastomer, thus increasing an amount of the conductivity imparting agent contained in the thermoplastic elastomer. Accordingly, there is a high density of the conductivity imparting agent contained in the thermoplastic elastomer, and cohesion is likely to occur, resulting in reducing the wear resistance and reducing the flexibility at a low temperature.

Therefore, as a component for imparting the heat resistance to the thermoplastic elastomer, a low-crystalline component having excellent filler acceptability is desirable. After study on such a component, a low-crystalline propylene-based elastomer is found to be excellent as the component used in combination with styrene-based thermoplastic elastomer. According to such a thermoplastic elastomer, the heat resistance of the styrene-based thermoplastic elastomer is improved, and meanwhile, the styrene-based thermoplastic elastomer has an excellent filler acceptability, and the conductivity imparting agent can be satisfactorily dispersed, thus suppressing the reduction of the wear resistance due to increase of the amount of the conductivity imparting agent, or suppressing the reduction of the flexibility at a low temperature.

The present invention is provided based on the above-mentioned knowledge.

<Elastomer Composition>

An elastomer composition according to an embodiment of the present invention will be described hereafter.

The elastomer composition of this embodiment contains an elastomer component (A) including styrene-based thermoplastic elastomer (a1), and propylene-based elastomer (a2), conductivity imparting agent (B), and process oil (C). Each component will be described hereafter.

(Elastomer Component (A))

The elastomer composition includes the elastomer component (A) as a base polymer. In this embodiment, the elastomer composition includes the styrene-based thermoplastic elastomer (a1) and the propylene-based elastomer (a2) as the elastomer component (A).

The styrene-based thermoplastic elastomer (a1) is a block copolymer or a random copolymer having high cohesive polymer block (hard segment) consisting of polystyrene, and rubbery polymer block consisting of polyolefin (soft segment). Specifically, a styrene-butadiene-styrene block copolymer (SBS), styrene-isoprene-styrene block copolymer (SIS), styrene-isoprene-butadiene-styrene block copolymer (SIBS), and styrene-ethylene-butylene-styrene block copolymer (SEBS) in which hydrogen is added to the above copolymers, styrene-ethylene-propylene-styrene block copolymer (SEPS), and styrene-ethylene-ethylene-propylene-styrene block copolymers (SEEPS), etc., are given. These copolymers may be used alone or may be used in combination of two or more. From a view point of improving the heat resistance of the elastomer composition, it is preferably to use SEBS, SEPS, or SEEPS in which hydrogen is added and no double bond is included in a molecular chain.

Styrene content in the styrene-based thermoplastic elastomer (a1) is not particularly limited, but from a viewpoint of flexibility at a low temperature and wear resistance of the elastomer composition, 10 mass % or more and 60 mass % or less is preferable. A molecular weight is not particularly limited.

The propylene-based elastomer (a2) is a copolymer mainly composed of propylene, and is obtained by copolymerizing or mixing a highly crystalline component consisting of propylene (hard segment), and an amorphous component consisting of α-olefins such as ethylene and butene (soft segment). The propylene-based elastomer (a2) has the hard segment, thus contributing to the heat resistance of the elastomer composition. The propylene-based elastomer (a2) also has the soft segment, and has a low crystallinity compared to the highly crystalline resin for example such as polypropylene, and has excellent filler acceptability. Therefore, a large amount of conductivity imparting agent can be uniformly dispersed in the elastomer composition, and reduction of the wear resistance and the flexibility due to the cohesion of the conductivity imparting agent can be suppressed.

In the propylene-based elastomer (a2), linear or branched α-olefin having 2 to 8 carbon numbers can be given as the α-olefin constituting the soft segment. For example, ethylene, propylene, 1-butene, 1-pentene, 3-methyl-1-butene, 1-hexene, 4-methyl-1-pentene, 3-methyl-1-pentene, and 1-octene, etc., can be given.

From a viewpoint of satisfactorily dispersing the conductivity imparting agent (B) and suppressing the reduction of various characteristics such as wear resistance, the propylene-based elastomer (a2) has preferably a crystal fusion heat of 25 J/g or less, and more preferably 20 J/g or less as determined by differential scanning calorimetry (DSC). The crystal fusion heat indicates an amount of heat required for melting a crystalline region included in elastomer. According to the crystal fusion heat, the ratio of the crystalline region included in elastomer is grasped from an amount of the crystal fusion heat, and it is found that the smaller the crystal fusion heat is, the smaller the ratio of the crystalline region is. In this embodiment, the wear resistance of the elastomer composition can be improved by using the component having the crystal fusion heat of 25 J/g or less or 20 J/g or less and having low crystallinity as the propylene-based elastomer (a2).

From a viewpoint of increasing the flexibility of the elastomer composition at a low temperature, preferably the propylene-based elastomer (a2) has a low glass transition temperature. Specifically, the glass transition temperature is preferably −5° C. or less, and more preferably −10° C. or less.

In the elastomer component (A), the ratio of the styrene-based thermoplastic elastomer (a1) to the propylene-based elastomer (a2) is preferably 10:20 to 90:10, and more preferably 30:70 to 80:20 by mass ratio. With such a ratio, the characteristic of each component can be obtained, and in the elastomer composition, high conductivity, well-balanced wear resistance, flexibility at a low temperature and heat resistance, can be obtained with a high level.

(Conductivity Imparting Agent (B))

The conductivity imparting agent (B) is the agent for imparting conductivity to the elastomer composition. The conductivity imparting agent (B) is not particularly limited, and for example carbon black can be used. Furnace black, Ketjen black, acetylene black, channel black, thermal black, thermal black, and lamp black, etc., can be used as the carbon black. These carbon blacks may be used alone, or may be used in combination of two or more of them. Among them, Ketjen black is preferable. According to Ketjen black, excellent conductivity can be obtained with a small mixture amount, and therefore the flexibility of the elastomer composition can be maintained to be high at a low temperature. A particle size is not particularly limited.

The mixture amount of the conductivity imparting agent (B) is 10 pts.mass or more and 100 pts.mass or less based on 100 pts.mass of elastomer component (A). By setting the mixture amount to 10 pts.mass or more and preferably 20 pts.mass or more, high conductivity can be maintained in the elastomer composition. On the other hand, by setting be mixture amount to 100 pts.mass or less and preferably 80 pts.mass or less, the conductivity imparting agent can be satisfactorily dispersed in the elastomer composition, and the high flexibility at a low temperature and the wear resistance can be maintained.

(Process Oil (C))

Process oil (C) is the oil for increasing the flexibility by lowering the hardness of the elastomer composition, and improving a moldability by lowering a melt viscosity. In this embodiment, as described above, a large amount of the conductivity imparting agent (B) is mixed, and therefore the hardness and the melt viscosity of the elastomer composition is likely to be high. However, by mixing the process oil (C), they can be adjusted to be low.

As the process oil (C), for example paraffin-based, naphthene-based, and aroma-based mineral oils can be used. Among them, paraffin-based mineral oil is preferable from a viewpoint of increasing the flexibility of the elastomer composition at a low temperature. Kinematic viscosity of the process oil (C) is not particularly limited, and a publicly-known one can be used.

The mixture amount of the process oil (C) is 10 pts.mass or more and 300 pts.mass or less based on 100 pts.mass of the elastomer component (A). By setting the mixture amount to 10 pts.mass or more and preferably 20 pts.mass or more, the hardness of the elastomer composition can be lowered, and the flexibility and the moldability of the elastomer composition can be improved. On the other hand, by setting the mixture amount to 300 pts.mass or less and preferably 200 pts.mass or less, a mechanical strength of the elastomer composition can be maintained, and high wear resistance can be maintained.

(Other Additive Agent)

Other additive agent may be contained in the elastomer composition as needed, other than the abovementioned component. For example, in order to further improve the wear resistance, a crosslinking agent may be contained in the elastomer composition when the elastomer composition is subjected to dynamic crosslinking. The crosslinking agent that generates free radicals by thermal decomposition, can be used as the crosslinking agent. Owing to the dynamic crosslinking, a crosslinked structure can be introduced to the styrene-based thermoplastic elastomer (a1) of the elastomer component (A). On the other hand, the polyolefin-based thermoplastic elastomer (a2) is a disintegrating polymer, and therefore the main chain is simply decomposed by the crosslinking agent, and the crosslinked structure is not introduced thereto.

The mixture amount of an organic peroxide is not particularly limited, and 0.05 pts.mass or more and 2 pts.mass or less may be preferable based on 100 pts.mass of the elastomer component (A). If the mixture amount is excessively small, the crosslinked structure cannot be sufficiently introduced to the styrene-based thermoplastic elastomer (a1), and an effect of improving the wear resistance cannot be obtained. On the other hand, if the mixture amount is excessively large, the polyolefin-based thermoplastic elastomer (a2) is decomposed, to thereby possibly remarkably reduce the mechanical strength of the elastomer composition.

As the crosslinking agent, for example, dicumyl peroxide, di-t-butyl peroxide, benzoyl peroxide, 1,1-bis(t-butylperoxy)-3,3,5-trimethylcyclohexane, t-Buchirupa butylperoxy isopropyl carbonate, t-butyl peroxybenzoate, 2,5-dimethyl-2,5-bis(t-benzolyperoxy) hexane, methyl ethyl ketone peroxide, 2,2-bis(t-butylperoxy) butane, and cumene hydroperoxide, etc., can be used. These crosslinking agents can be used alone or may be used in combination of two or more.

A processing aid, a flame retardant, a flame retardant aid, a crosslinking aid, an ultraviolet absorber, an antioxidant, a copper inhibitor, a lubricant, a filler, a compatibilizer, and a stabilizer, etc., can be used for the elastomer composition, other than the abovementioned crosslinking agent.

Thus, the elastomer composition of this embodiment is configured so that the conductivity imparting agent (B) is uniformly dispersed in the elastomer component (A), by containing the polyolefin-based thermoplastic elastomer (a2) together with the styrene-based thermoplastic elastomer (a1) as the elastomer component (A), although a large amount of conductivity imparting agent (B) is contained therein. Therefore, the reduction of the flexibility and the wear resistance due to cohesion of the conductivity imparting agent (B) is suppressed.

Further, the elastomer composition of this embodiment contains 10 pts.mass or more and 100 pts.mass of less of the conductivity imparting agent (B) based on 100 pts.mass of the elastomer component (A), and therefore has a high conductivity, and a low volume resistivity.

Further, the elastomer composition of this embodiment has a prescribed heat resistance, because the polyolefin-based thermoplastic elastomer (a2) having a relatively high crystallinity, is contained therein.

Further, the elastomer composition of this embodiment has an excellent flexibility, because the conductivity imparting agent (B) is uniformly dispersed, and the process oil (C) is contained therein. In addition, the viscosity (melt viscosity) during melting is low, and the moldability is excellent. Specifically, a Mooney viscosity $ML_{1+4}$ (200° C.) described later in examples becomes 120 or less.

Further, in the elastomer composition of this embodiment, the crosslinked structure is introduced to the styrene-based thermoplastic elastomer (a1) and the polyolefin-based thermoplastic elastomer (a2) is remained to be uncrosslinked. Namely, the crosslinked structure is constituted in a part of the elastomer component (A). Thus, the elastomer composition has a desired high wear resistance by introducing the crosslinked structure, while maintaining thermoplastic property.

<Preparation of the Elastomer Composition>

A method of preparing the elastomer composition will be described next.

The elastomer composition of this embodiment is prepared by mixing and kneading the styrene-based thermoplastic elastomer (a1), the polyolefin-based thermoplastic elastomer (a2), the conductivity imparting agent (B), and the process oil (C) at a prescribed mixing ratio. Kneading can be performed using a publicly-known kneader, and for example, a kneader or a Banbury mixer, a twin-screw kneading extruder, and an open roll, etc., can be used.

When the elastomer composition is subjected to the dynamically crosslinking, the organic peroxide is mixed, and a mixing method is not particularly limited. For example, the organic peroxide may be simultaneously mixed when other mixing agent is mixed, or may be mixed after uniformly mixing other mixing agent. After the organic peroxide is mixed, the elastomer composition is subjected to the dynamically crosslinking by kneading it while heating it. Thus, the crosslinked structure is introduced to the styrene-based thermoplastic elastomer (a1), and on the other hand, the polyolefin-based thermoplastic elastomer (a2) is set in an uncrosslinked state.

<Molded Article>

A molded article composed of the elastomer composition will be described next.

The molded article of this embodiment is obtained by melting and kneading the elastomer composition, and thereafter molding and solidifying it into a desired shape. As a molding method, for example, publicly-known methods such as extrusion, injection molding, and press molding, etc., can be used.

The molded article of this embodiment is composed of the elastomer composition, and therefore has excellent flexibility and wear resistance at a low temperature, while having high conductivity. Specifically, the molded article has high conductivity, and the volume resistivity is IQ cm or less, and has excellent flexibility at a low temperature, and has a storage elastic modulus of 500 MPa or less at −10° C., and also has excellent wear resistance, with a wear volume of 5 mg or less as shown in examples described later. When the wear resistance is improved by dynamic crosslinking, the wear volume becomes 1 mg or less.

For example, an electromagnetic shielding, an anti-static material, and a pressure-sensitive electrode, etc., can be given as the molded article of this embodiment.

EXAMPLES

The present invention will be further described hereafter based on detailed examples. The present invention is not limited to these examples.

Following materials are used in this example.

Styrene-ethylene-ethylene-propylene-styrene block copolymer (SEEPS; referred to as elastomer (a1) hereafter, "Septon 4055" produced by Kuraray Co., Ltd., having styrene content of 30 mass % or less) was used as the styrene-based thermoplastic elastomer (a1).

As the propylene-based elastomer (a2), two kinds of "Welnex RFG4VM" (glass transition temperature: −9° C., crystal fusion heat: 23 J/g or less, referred to as elastomer (a1-1)) produced by Japan Polypropylene Co., Ltd., and "Tafmer PN-2060" (glass transition temperature: −15° C., crystal fusion heat: 9 J/g or less, referred to as elastomer (a1-2)) produced by Mitsui Chemicals Co., Ltd. were used.

As the conductivity imparting agent (B), Ketjen black as carbon black ("EC600JDJ produced by Lion Corporation) was used.

As the process oil (C), "Lucant HC-40" produced by Mitsui Chemicals. was used.

As the organic peroxide as a crosslinking agent, "Perbutyl P" produced by Nippon Oil & Fats Co., Ltd. was used.

As a highly crystalline resin as a comparative material, polypropylene (referred to as PP "Novatec EC9", glass transition temperature: 6° C., crystal fusion heat 74 J/g) produced by Japan Polypropylene Corp. was used.

<Preparation of the Elastomer Composition>

Each material was kneaded at a ratio shown in the following table 1, to thereby prepare the elastomer composition of example 1 to 7 and comparative examples 1 to 5.

TABLE 1

(Unit: pts.mass)

| | | | | Example | | | | | | | Comparative example | | | | |
|---|---|---|---|---|---|---|---|---|---|---|---|---|---|---|---|
| | | | | 1 | 2 | 3 | 4 | 5 | 6 | 7 | 1 | 2 | 3 | 4 | 5 |
| Mixture | Elastomer component (A) | Styrene-based thermoplastic elastomer (a1) | Elastomer (a1) | 50 | 50 | 30 | 80 | 60 | 70 | 50 | 50 | 30 | 80 | 60 | 70 |
| | | Propylene-based elastomer (a2) | Elastomer (a2-1) (glass transition temperature: −9° C., crystal fusion heat: 23 J/g) | 50 | — | 70 | — | — | 30 | — | — | 70 | — | — | 30 |
| | | | Elastomer (a2-2) (glass transition temperature: −15° C., crystal fusion heat 9 J/g) | — | 50 | — | 20 | 40 | — | 50 | — | — | 20 | 40 | — |
| | Conductivity imparting agent (B) | | Carbon black | 50 | 50 | 25 | 75 | 10 | 100 | 50 | 50 | 25 | 75 | 5 | 110 |
| | Process oil (C) | | | 100 | 100 | 10 | 300 | 50 | 100 | 100 | 100 | 5 | 325 | 50 | 100 |
| | Highly crystalline resin | | Polypropylene (glass transition temperature: 6° C., crystal fusion heat 74 J/g) | — | — | — | — | — | — | — | 50 | — | — | — | — |
| | Other additive agent | Crosslinking agent | Organic peroxide | — | — | — | — | — | — | 0.1 | — | — | — | — | — |
| Characteristic | Moldability | | Mooney viscosity (ML$_{1:4}$ (200° C.)) | 95 | 94 | 118 | 80 | 88 | 120 | 101 | 98 | 133 | 77 | 85 | 140 |
| | Conductivity | | Volume resistivity [Ω · cm] | 0.5 | 0.6 | 0.6 | 0.9 | 1.0 | 0.2 | 0.5 | 0.4 | 0.6 | 0.9 | 1.8 | 0.1 |
| | Flexibility at low temperature | | Storage elastic modulus (−10° C.) [MPa] | 426 | 150 | 483 | 125 | 178 | 490 | 164 | 797 | 510 | 116 | 170 | 519 |
| | Wear resistance | | Wear volume [mg] | 4.2 | 1.2 | 2.0 | 3.9 | 0.8 | 4.8 | 0.4 | 8.5 | 2.5 | 5.5 | 0.7 | 5.1 |

Example 1

In example 1, as shown in table 1, 50 pts.mass of styrene-based elastomer (a1), 50 pts.mass of propylene-based elastomer (a2-1), 50 pts.mass of carbon black, and 100 pts.mass of process oil were mixed, and the mixture was kneaded using a 3 L kneader, to thereby prepare the elastomer composition of example 1. A kneading temperature was set to 200° C., and the number of rotations was set to 30 rpm.

Examples 2 to 6

In examples 2 to 6, as shown in table 1, the elastomer composition was prepared similarly to example 1, other than a point that the mixture amount or the kind of each material was suitably changed.

Example 7

In example 7, as shown in table 1, 50 pts.mass of styrene-based elastomer (a1), 50 pts.mass of propylene-based elastomer (a2-2), 50 pts.mass of carbon black, and 100 pts.mass of process oil were mixed, and the mixture was kneaded using the 3 L kneader, to thereby prepare the elastomer composition. Then, 0.1 pts.mass of organic peroxide as a crosslinking agent was added to the elastomer composition, and the mixture was kneaded for further 5 minutes, to thereby apply dynamic crosslinking to the elastomer composition.

Comparative Example 1

In comparative example 1, the elastomer composition was prepared similarly to example 1, other than a point that polypropylene as the highly crystalline resin was used, instead of the propylene-based elastomer (a2-1).

Comparative Examples 2 and 3

In comparative example 2, the elastomer composition was prepared similarly to example 3, other than a point that the mixture amount of the process oil was reduced to 5 pts.mass based on 100 pts.mass of the elastomer component (A).

In comparative example 3, the elastomer composition was prepared similarly to example 4, other than a point that the mixture amount of the process oil was increased to 325 pts.mass based on 100 pts.mass of the elastomer component (A).

Comparative Examples 4 and 5

In comparative example 4, the elastomer composition was prepared similarly to example 5, other than a point that the mixture amount of the carbon black was reduced to 5 pts.mass based on 100 pts.mass of the elastomer component (A).

In comparative example 5, the elastomer composition was prepared similarly to example 6, other than a point that the mixture amount of the carbon black was increased to 110 pts.mass based on 100 pts.mass of the elastomer component (A).

<Fabrication of a Sample>

In this example, the prepared elastomer composition was molded into a sheet shape by an open roll, and a hot pressing was applied thereto at 200° C., to thereby form an evaluation sheet.

<Evaluation Method>

Regarding the prepared elastomer composition and the formed evaluation sheet, evaluation was performed by the following method. An evaluation result is shown in table 1.

(Moldability)

The moldability of the elastomer composition was evaluated by the Mooney viscosity $ML_{1+4}$ (200° C.). The Mooney viscosity was measured in conformity to JIS K6300-1, and in this example, the moldability was evaluated to be excellent when the Mooney viscosity was 120 or less.

(Conductivity)

The conductivity of the evaluation sheet was evaluated by its volume resistivity. The volume resistivity was measured by a four probe method in conformity to JIS K7194, and in this example, the conductivity was evaluated to be excellent when the volume resistivity was 1 Ω·cm or less.

(Wear Resistance)

The wear resistance of the evaluation sheet was evaluated by the wear amount when the evaluation sheet is worn. Specifically, as shown in FIG. 1, the evaluation sheet 1 having a length of 100 mm, a width of 100 mm, and a thickness of 1 mm, was fixed to top and bottom of the jig 4 one by one, and thereafter a polyethylene-coated wire 2 having a diameter of 1.5 mm and a length of 500 mm was pinched between the evaluation sheet 1, and a ION weight 3 was placed thereon from top of the jig 4. Then, the polyethylene-coated wire 2 was pulled-out at a rate of 500 mm/min, and a total weight of the evaluation sheet was weighed, to thereby obtain a reduction portion as a wear amount (mg). In this example, the evaluation sheet was evaluated as having excellent wear resistance when the wear amount is 5 mg or less.

(Flexibility)

The flexibility of the evaluation sheet was evaluated by the storage elastic modulus at −10° C. The storage elastic modulus was measured in conformity to JIS K7244-4, under each condition of a tensile mode, a heating rate of 10° C./min, frequency of 10 Hz, and a distortion of 0.5%. In this example, the evaluation sheet was evaluated as having an excellent flexibility at a low temperature when the storage elastic modulus was 500 MPa or less.

<Evaluation Result>

In examples 1 to 7, it was confirmed that the evaluation sheet had excellent moldability, conductivity, flexibility at a low temperature, and wear resistance.

Particularly, in examples 2, 4, and 5, elastomer (a2-2) having the glass transition temperature of −10° C. or less and the crystal fusion heat of 20 J/g or less, was used as the propylene-based elastomer (a2). Therefore, it was found that the storage elastic modulus could be low, and the wear amount could be reduced, compared to example 1, etc. Namely, it was confirmed that the flexibility at a low temperature, and the wear resistance could be more improved.

Further, in example 7, the elastomer composition was dynamically crosslinked, and the crosslinked structure was partially introduced. Therefore, it was confirmed that the wear resistance could be reduced, and the wear resistance could be improved, compared to example 2 in which the dynamic crosslinking was not applied to the elastomer composition.

On the other hand, in comparative example 1, polypropylene as a highly crystalline resin was used, and it was confirmed that the flexibility at a low temperature, and the wear resistance were reduced in the evaluation sheet, probably because a large amount of carbon black could not be uniformly dispersed therein.

In comparative example 2, the process oil was mixed by a smaller amount than a regulated amount, and therefore it was confirmed that the moldability of the elastomer composition was low. It was also confirmed that the hardness of the molded evaluation sheet was high, and the flexibility at a low temperature was low.

In comparative example 3, the process oil was mixed by a larger amount than the regulated amount. Therefore, it was confirmed that the mechanical strength of the evaluation sheet was reduced, thus increasing the wear amount, and the wear resistance becomes poor.

In comparative example 4, the carbon black was mixed by a smaller amount than the regulated amount. Therefore, it was confirmed that the conductivity was low.

In comparative example 5, the carbon black was mixed by a larger amount than the regulated amount. Therefore, it was confirmed that the moldability of the elastomer composition was reduced, and also the flexibility and the wear resistance at a low temperature were reduced in the evaluation sheet.

<Preferable Aspects of the Present Invention>

Preferable aspects of the present invention will be supplementarily described hereafter.

[Supplementary Description 1]

There is provided an elastomer composition containing an elastomer component (A) including styrene-based thermoplastic elastomer (a1) and propylene-based elastomer (a2); and containing 10 pts.mass or more and 100 pts.mass or less of a conductivity imparting agent (B), and 10 pts.mass or more and 300 pts.mass of less of a process oil (C) based on 100 pts.mass of the elastomer component (A).

[Supplementary Description 2]

There is provided the elastomer composition of the supplementary description 1, wherein the propylene-based elastomer (a2) has a crystal fusion heat of 25 J/g or less as determined by differential scanning calorimetry.

[Supplementary Description 3]

There is provided the elastomer composition of the supplementary description 1 or 2, wherein the propylene-based elastomer (a2) has a glass transition temperature of −5° C. or less.

[Supplementary Description 4]

There is provided the elastomer composition of any one of the supplementary descriptions 1 to 3, wherein the elastomer component (A) contains the styrene-based thermoplastic elastomer (a1) and the propylene-based elastomer (a2) at a mass ratio in a range of 10:90 to 90:10.

[Supplementary Description 5]

There is provided the elastomer composition of any one of the supplementary descriptions 1 to 4, wherein the elastomer component (A) contains the styrene-based thermoplastic elastomer (a1) and the propylene-based elastomer (a2) at a mass ratio in a range of 30:70 to 80:20.

[Supplementary Description 6]

There is provided the elastomer composition of any one of the supplementary descriptions 1 to 5, containing 20 pts.mass or more and 80 pts.mass or less of the conductivity imparting agent (B), based on 100 pts.mass of the elastomer component (A).

[Supplementary Description 7]

There is provided the elastomer composition of any one of the supplementary descriptions 1 to 6, wherein the styrene-based thermoplastic elastomer (a1) is a block copolymer or a random copolymer having a segment composed of polystyrene, and a segment composed of polyolefin.

[Supplementary Description 8]

There is provided the elastomer composition of any one of the supplementary descriptions 1 to 7, wherein the propylene-based elastomer (a2) is a copolymer having a segment composed of propylene, and a segment composed of α-olefin.

[Supplementary Description 9]

According to another aspect of the present invention, there is provided a molded article composed of an elastomer composition, the elastomer composition containing an elastomer component (A) including styrene-based thermoplastic elastomer (a1) and propylene-based elastomer (a2), and containing 10 pts.mass or more and 100 pts.mass or less of a conductivity imparting agent (B), and 10 pts.mass or more and 300 pts.mass of less of a process oil (C) based on 100 pts.mass of the elastomer component (A).

[Supplementary Description 10]

There is provided the molded article of the supplementary description 9, wherein a storage elastic modulus at −10° C. is 500 MPa or less, and a volume resistivity at −10° C. is 1 Ω·cm or less.

[Supplementary Description 11]

There is provided the molded article of the supplementary description 9 or 10, wherein the elastomer composition is formed by dynamic crosslinking, and a crosslinked structure is introduced to the styrene-based thermoplastic elastomer (a1).

[Supplementary Description 12]

There is provided the molded article of any one of the supplementary descriptions 9 to 11, which is formed into a sheet shape, and is formed as at least one of an electromagnetic shielding, an anti-static material, and a pressure-sensitive switch electrode.

DESCRIPTION OF SIGNS AND NUMERALS

1 Evaluation sheet
2 Polyethylene-coated wire
3 Weight
4 Jig

The invention claimed is:

1. An elastomer composition, comprising:
   an elastomer component (A) consisting of styrene-based thermoplastic elastomer (a1) and propylene-based elastomer (a2);
   a conductivity imparting agent (B) contained in an amount of 10 pts.mass or more and 100 pts.mass or less based on 100 pts.mass of the elastomer component (A); and
   a process oil (C) contained in an amount of 10 pts.mass or more and 300 pts.mass or less based on 100 pts.mass of the elastomer component (A),
   wherein only the elastomer component (A) is contained as a polymer component, and
   wherein the styrene-based thermoplastic elastomer (a1) consists of a styrene-ethylene-ethylene-propylene-styrene block copolymer.

2. The elastomer composition according to claim 1, wherein the propylene-based elastomer (a2) has a crystal fusion heat of 25 J/g or less as determined by differential scanning calorimetry.

3. The elastomer composition according to claim 1, wherein the propylene-based elastomer (a2) has a glass transition temperature of −5° C. or less.

4. The elastomer composition according to claim 1, wherein the elastomer component (A) contains the styrene-based thermoplastic elastomer (a1) and the propylene-based elastomer (a2) at a mass ratio in a range of 10:90 to 90:10.

5. The elastomer composition according to claim 1, wherein the elastomer component (A) contains the styrene-based thermoplastic elastomer (a1) and the propylene-based elastomer (a2) at a mass ratio in a range of 30:70 to 80:20.

6. The elastomer composition according to claim 1, wherein the conductivity imparting agent (B) is contained in an amount of 20 pts.mass or more and 80 pts.mass or less based on 100 pts.mass of the elastomer component (A).

7. The elastomer composition according to claim 1, wherein the propylene-based elastomer (a2) includes a copolymer having a segment composed of propylene, and a segment composed of α-olefin.

8. The elastomer composition according to claim 1, wherein the amount of the conductivity imparting agent (B) is in a range from 20 pts.mass to 80 pts.mass based on 100 pts.mass of the elastomer component (A).

9. The elastomer composition according to claim 1, wherein the conductivity imparting agent (B) comprises carbon black.

10. The elastomer composition according to claim 1, wherein the conductivity imparting agent (B) comprises Ketjen black.

11. The elastomer composition according to claim 1, wherein the amount of the process oil (C) is in a range from 20 pts.mass to 200 pts.mass based on 100 pts.mass of the elastomer component (A).

12. A molded article composed of an elastomer composition, the elastomer composition comprising:
   an elastomer component (A) consisting of styrene-based thermoplastic elastomer (a1) and propylene-based elastomer (a2);
   a conductivity imparting agent (B) contained in an amount of 10 pts.mass or more and 100 pts.mass or less based on 100 pts.mass of the elastomer component (A); and
   a process oil (C) contained in an amount of 10 pts.mass or more and 300 pts.mass or less based on 100 pts.mass of the elastomer component (A),
   wherein only the elastomer component (A) is contained as a polymer component, and
   wherein the stryene-based thermoplastic elastomer (a1) consists of a styrene-ethylene-ethylene-propylene-styrene block copolymer.

13. The molded article according to claim 12, wherein a storage elastic modulus at −10° C. is 500 MPa or less, and a volume resistivity is 1 Ω·cm or less.

14. The molded article according to claim 12, wherein the elastomer composition is formed by dynamic crosslinking, and a crosslinked structure is introduced to the styrene-based thermoplastic elastomer (a1).

15. The molded article according to claim 12, is formed into a sheet shape, and is formed as at least one of an electromagnetic shielding, an anti-static material, and a pressure-sensitive switch electrode.

16. The molded article according to claim 12, wherein the amount of the conductivity imparting agent (B) is in a range from 20 pts.mass to 80 pts.mass based on 100 pts.mass of the elastomer component (A).

17. The molded article according to claim 12, wherein the conductivity imparting agent (B) comprises carbon black.

18. The molded article according to claim 12, wherein the conductivity imparting agent (B) comprises Ketjen black.

19. The molded article according to claim 12, wherein the amount of the process oil (C) is in a range from 20 pts.mass to 200 pts.mass based on 100 pts.mass of the elastomer component (A).

* * * * *